United States Patent
Wu et al.

(10) Patent No.: US 8,022,164 B1
(45) Date of Patent: Sep. 20, 2011

(54) TWO-COMPONENT SOLVENT-FREE POLYURETHANE ADHESIVES

(75) Inventors: Yang Wu, Honolulu, HI (US); Chaofeng Ning, Zhejiang (CN); Xinbing Yuan, Zhejiang (CN); Xinping Feng, Zhejiang (CN)

(73) Assignees: Microvast, Inc., Stafford, TX (US); Huzhou Ochem Chemical Co., Ltd., Huzhou (CN)

( * ) Notice: Subject to any disclaimer, the term of this patent is extended or adjusted under 35 U.S.C. 154(b) by 0 days.

(21) Appl. No.: 12/717,610

(22) Filed: Mar. 4, 2010

(51) Int. Cl.
*C08G 18/28* (2006.01)

(52) U.S. Cl. .......................... 528/85; 524/153

(58) Field of Classification Search .......... 528/85; 524/153
See application file for complete search history.

(56) References Cited

U.S. PATENT DOCUMENTS

| | | |
|---|---|---|
| 6,180,686 B1 | 1/2001 | Kurth |
| 6,465,569 B1 | 10/2002 | Kurth |
| 6,624,244 B2 | 9/2003 | Kurth |
| 6,649,667 B2 | 11/2003 | Clatty |
| 2004/0138402 A1 | 7/2004 | Thiele et al. |
| 2006/0276614 A1 | 12/2006 | Niemann |

FOREIGN PATENT DOCUMENTS

| | | |
|---|---|---|
| CN | 101280167 | 10/2008 |
| CN | 101289602 | 10/2008 |
| WO | WO2007149589 | 12/2007 |

OTHER PUBLICATIONS

DOW Chemical; Creating Bio-Based Polyols for Adhesives and Sealants; printed on Jun. 3, 2010 from Renuva Renewable Resource Technology.

*Primary Examiner* — Peter Szekely
(74) *Attorney, Agent, or Firm* — Baker & McKenzie LLP

(57) ABSTRACT

A two-component solvent-free polyurethane laminating adhesive for flexible packaging, including a First Component and a Second Component is provided. The First Component, which acts as a resin, includes a first vegetable oil based Polyol A in an amount from 20 to 40 weight percent, a second vegetable oil based Polyol B in an amount from 0.5 to 5 weight percent, and a Polyisocyanate C in an amount from 60 to 74 weight percent. The Second Component, which acts as a hardener, includes a first vegetable oil based Polyol A in an amount from 87 to 99 weight percent, and a Polyol E in an amount from 0.5 to 5 weight percent. The first vegetable oil based Polyol A is preferably a hydroxylated castor oil, and the second vegetable oil based Polyol B is preferably hydroxylated linseed oil.

19 Claims, 1 Drawing Sheet

TWO-COMPONENT SOLVENT-FREE POLYURETHANE ADHESIVES

FEDERALLY SPONSORED RESEARCH

No applicable

REFERENCE TO MICROFICHE APPENDIX

No applicable

FIELD OF THE INVENTION

The present invention relates to two component laminating polyurethanes adhesives used in flexible packaging industry.

BACKGROUND OF THE INVENTION

Recently, complex flexible packaging is developed by industry players due to package strength requirement, food protection needs, labeling and appearance needs of package. The complex flexible packaging is prepared via the laminated films produced by so-called laminating adhesives (also called laminate adhesives). The current main stream of such a laminate adhesive is a two-component (or two-part) type polyurethane (PU) adhesive, composed of a first component base resin having an isocyanate (NCO) group ("First Component") and a second component curing agent (also called hardener) having one or more active hydrogen groups ("Second Component"). The two-part type polyurethane adhesive has excellent adhesivity, durability, and heat resistance properties. Further, it can be widely applied in the manufacture of film/film and film/metal foil laminates including multilayer laminates in food packaging industry and other industries.

Typically, the first component contains an isocyanate-containing polyurethane prepolymer obtained by the reaction of excess diisocyanate with a polyether and/or polyester containing two or more active hydrogen groups per molecule. The second component usually is a polyether and/or polyester functionalized with two or more hydroxyl groups or the like per molecule. The two components are combined in a predetermined ratio and applied on one of the film or metal foil substrates, which is then laminated to a second substrate. Application may be from a solution in a suitable solvent using gravure or smooth roll coating cylinders or from a solvent-free state using special application machinery.

Solvent-free or solventless laminating adhesives, that can be applied at 100% solids and that do not contain either organic solvents or water, have a distinct advantage because they can be applied and operated at very high line speed. This is due to the fact that there is no organic solvent or water which must be removed from the adhesive. The application speed of solvent or waterbased laminating adhesives is limited because the solvent or water must be effectively dried in an oven, or otherwise removed, and such solvent/water removal process is generally time-consuming.

In order to obtain NCO-terminated PU prepolymers, it is a common practice to react polyhydric alcohols with an excess of monomeric polyisocyanates—generally at least predominantly diisocyanates.

It is known that, irrespective of the reaction time, a certain quantity of the polyisocyanate used in excess reamains unreacted. The presence of monomeric polyisocyanate is problematical, for example, when readily volatile diisocyanates have been used as the monomeric polyisocyanate. "Readily volatile" as used herein represents the property of the substances having a vapor pressure of more than about 0.0007 mm Hg at 30° C. or at a boiling point less than about 190° C. (70 mPa).

Even at room temperature, the significant vapor pressure of volatile diisocyanates, such as 2,4-toluene diisocyanate (TDI), is a serious issue during spray application process. Since isocyanate vapor is toxic, the use of products with a high content of readily volatile diisocyanates involves elaborate measures on the part of the users to protect themselves, more particularly elaborate measures for keeping the surrounding air fit to inhale, as legally stipulated by the maximum permitted concentration of working materials as gas, vapor or particulate matter in the air at the workplace.

Because protective and cleaning measures generally involve considerable financial investment and operating cost, there is a need for products which, depending on the isocyanate used, have a low content of readily volatile diisocyanates.

Currently, the vast majority of adhesives marketed are based on petroleum derived components. The use of petrochemicals such as polyester or polyether polyols is disadvantageous for a variety of reasons. Because petrochemicals are ultimately derived from petroleum, the production of a polyol requires a great deal of energy, as oil must be drilled, refined, and processed to make the polyols. Moreover, petrochemical based polyols are subject to price fluctuations and availabilities of petroleum and natural gas. As the public becomes more aware of environmental issues, there are distinct marketing disadvantages in using petrochemical based products. With the continuously growing demand for "greener" products from consumers, there is a motivation to replace polyester or polyether polyols, as used in the production of polyurethane adhesives, with a more versatile, renewable, less costly, and more environmentally friendly component.

Efforts have been made to address these challenges. Bio-based oil sources such as soy oil, castor oil, palm oil, linseed oil, or chemicals derived from them for instance oleochemical polyols, are suggested as substitutes for the polyols in the second components of the urethane reactants, for manufacturing foams, elastomers, plastics, adhesives and other products, as they provide the promise of a relatively stable and renewable raw material source.

U.S. Pat. Nos. 6,624,244 and 6,465,569 disclose the combination of a multi functional polyol such as ethylene glycol and blown soy oil with an isocyanate to form urethane foam. U.S. Pat. No. 6,649,667 discloses the reaction of a mixture of polyester or polyether Polyol and a blown vegetable oil with an isocyanate in a reaction-injection-molded (RIM) process to produce closed cell polyurethane foam. U.S. Pat. No. 6,180,686 discloses polyurethane foam prepared by reaction of an isocyanate with a mixture of a blown vegetable oil and a polyether polyol. Because soybeans or the like are renewable, relatively inexpensive, versatile, and environmentally friendly, they are desirable as ingredients for foam manufacturers. Soybeans may be processed to yield fatty acid triglyceride rich soy oil and protein rich soy flour.

DE 44 01 572 A1 describes a two-component polyurethane adhesive based on an isocyanate component and on a polyol component, which contain an oleochemical polyol such as castor oil from 2 to 7 percent by weight, based on the oleochemical polyol, of at least one di- and/or trifunctional alcohol, the hydroxyl value of the alcohols or the mixtures thereof being 1,100 to 1,850. This adhesive is suitable for non-load bearing wooden structural members.

U.S. Pat. Publication No. 20040138402A1 discloses a two-component polyurethane adhesive for wooden materials comprising components A and B wherein A) a polyol mixture, containing at least a) 10 to 98 wt. % of at least one oleochemical polyol, b) 1 to 7.5 wt. % of at least one diol having a hydroxyl value of 400 to 2,000 and c) 1 to 7.5 wt. % of at least one tri-, tetra- or pentafunctional polyol having a hydroxyl value of 200 to 2,000, the wt. % of each of a), b) and c) based on the whole of the polyol mixture, and B) at least one polyisocyanate, wherein the NCO/OH ratio of components A) and B) is within the range of 1.5 to 0.9, and further comprising from 0 to 85 wt. %, based on the total weight of the adhesive, of at least one auxiliary substance; wherein the polyol mixture contains up to 60 wt. %, based on the total weight of the polyol mixture, of a resin homogeneously dissolved therein. The adhesive is useful for bonding of load bearing wooden building components.

U.S. Pat. Publication No. 20060276614A1 describes a biobased multipurpose urethane adhesive in which the B side component is derived mainly from a vegetable oil, preferably soy oil. Preferably the vegetable oil derivative is a hydroxylated vegetable oil which is present in the B side component at a concentration from 65 to 98 weight percent. Optionally, a phosphated soy oil can be present in an amount from 0.1 to 15 weight percent to enhance the adhesive properties, particularly for use on metals. Also, water can be present in an amount from 0.1 to 10 weight percent with a slight amount of a surfactant to stabilize the mixture. Catalysts are included in the B side component to reduce the amount of the A side component and to accelerate curing of the adhesive. The A and B side components are admixed in amounts which provide from 40 to 90 weight percent of bio-based content in the adhesive.

CN101280167A discloses a solvent-free polyurethane laminating adhesive that could be processed at room temperature, comprises two components, where the hardener comprises 1%-10% weight percent of polyol a) with carbon chain length less than 12 carbon, at least two functionality 30% to 70% of polyol b) 20% to 70% of polyol c) modified by plant oil, and 0.01% to 1% of curing speed adjusting agent. The base resin comprises polyurethane prepolymers obtained by the reaction of 25% to 50% of polyol modified by plant oil or other polyester polyol or polyether polyol and 50% to 75% of diisocyanate.

Primary Aromatic Amine and Hazardous Effect:

In order to reduce the volatile effects of chemicals used in the laminating process, low-volatility diisocyanates, such as diphenylmethane diisocyanates (MDI), are typically used rather than high volatile diisocyanates TDI, wholly or partly. But the PU prepolymers based thereon have viscosities that are outside the range relevant to simple methods of application. Consequently, by adding an excess of diisocyanate monomers as reactive diluents, the viscosity of the polyurethane prepolymers could be reduced. Nevertheless, the incomplete reaction of the reactive diluents is capable of "migrating," even into the bonded materials. By contact with moisture ($H_2O$), the isocyanate groups of migrated material may react to form primary undesirable aromatic amines ($R-N=C=O+H_2O \rightarrow R-NH_2+CO_2$).

Migrated material and side reaction are undesirable in the food packaging industry, because the passage of the migrated material through the packaging material can lead to contamination of the packaged food product. To avoid contamination, the laminates must be "migrate-free". Another unwanted side effect caused by the migration is the antisealing effect during the production of bags or carrier bags using laminated plastic film. Thus, substances and preparations containing, for example, more than 0.1% free TDI fall under hazardous material regulations and have to be identified accordingly. The obligation to do so involves special measures for the food packaging industry.

Accordingly, reactive adhesives that are suitable for the production of composite materials should have a suitable application viscosity, but not contain or release any volatile or migratable substances into the environment or packaged material as such could cause hazardous effects to human beings. The current invention addresses these issues.

SUMMARY OF THE INVENTION

Certain embodiments of the invention provide a two-component solvent-free polyurethane adhesive comprising: a First Component comprising: a first vegetable oil based Polyol A in an amount from 20 to 40 weight percent; a second vegetable oil based Polyol B in an amount from 0.5 to 5 weight percent, and a Polyisocyanate C in amount from 60 to 74 weight percent; and a Second Component comprising: a first vegetable oil based Polyol A in an amount from 87 to 99 weight percent, and a Polyol E in an amount from 0.5 to 5 weight percent. In another embodiment, the first vegetable oil based Polyol A are selected from the group of castor oil based polyols and soybean oil based polyols. In certain embodiments of the invention, the amount of the first vegetable oil based Polyol A in the First Component is between 25 and 35 by weight percent. In alternative embodiments, the amount of the second vegetable oil based Polyol B in the First Component is between 1 and 3 by weight percent.

In another aspect of the invention, the second vegetable oil based Polyol B is linseed oil based polyol or tung oil based polyol. In specific embodiments, the amount of the first vegetable oil based Polyol A in the Second Component is between 92 and 97 by weight percent.

In another aspect of the invention, the Polyisocyanate C is a polyfunctional isocyanate containing between 2 and 5 NCO groups. While in specific embodiments, the Polyisocyanate C comprises 4,4'-diphenylmethane diisocyanate (MDI).

In another aspect of the invention, the Polyol E is selected from low molecular polyhydric alcohols or the corresponding polyester polyols prepared by the reaction of the low molecular polyols with low molecular polybasic carboxylic acids. The two-component solvent-free polyurethane adhesive of claim 9, wherein the Polyol E comprises low molecular diols or the corresponding polyester polyols prepared by the reaction of the low molecular polyols with low molecular dibasic carboxylic acids. The two-component solvent-free polyurethane adhesive of claim 10, wherein the Polyol E comprises dipropylene glycol.

In another aspect of the invention, the First Component further comprises Antioxidant D in an amount of less than about 0.5 weight percent. In specific embodiments, the Antioxidant D is selected from the group consisting of triphenyl phosphite, butylated hydroxyanisole (BHA), dibutyl hydroxy toluene (BHT), ditert-butylhydro quinone (TBHQ) and propyl gallate (PG).

In another aspect of the invention, the Second Component further comprises Coupling Agent F in an amount of less than about 0.5 weight percent. In specific embodiments, the Coupling Agent F is selected from the group consisting of silane coupling agents, chromium complex coupling agents and titante coupling agents.

In another aspect of the invention, the Second Component further comprises an Organic Acid Additive G in an amount of less than about 0.5 weight percent. In specific embodiments, the Organic Acid Additive G is selected from the group consisting of citric acid, acetic acid, acetic acid, oleic acid, and tannin.

In another aspect of the invention, the First Component and the Second Component of the adhesive are present in proportions of 100 parts of the First Component to 60 to 85 parts of the Second Component. In specific embodiments, the proportion of the First Component and the Second Component is 100 parts to 75 parts.

DETAILED DESCRIPTION OF THE INVENTION

Figure 1:
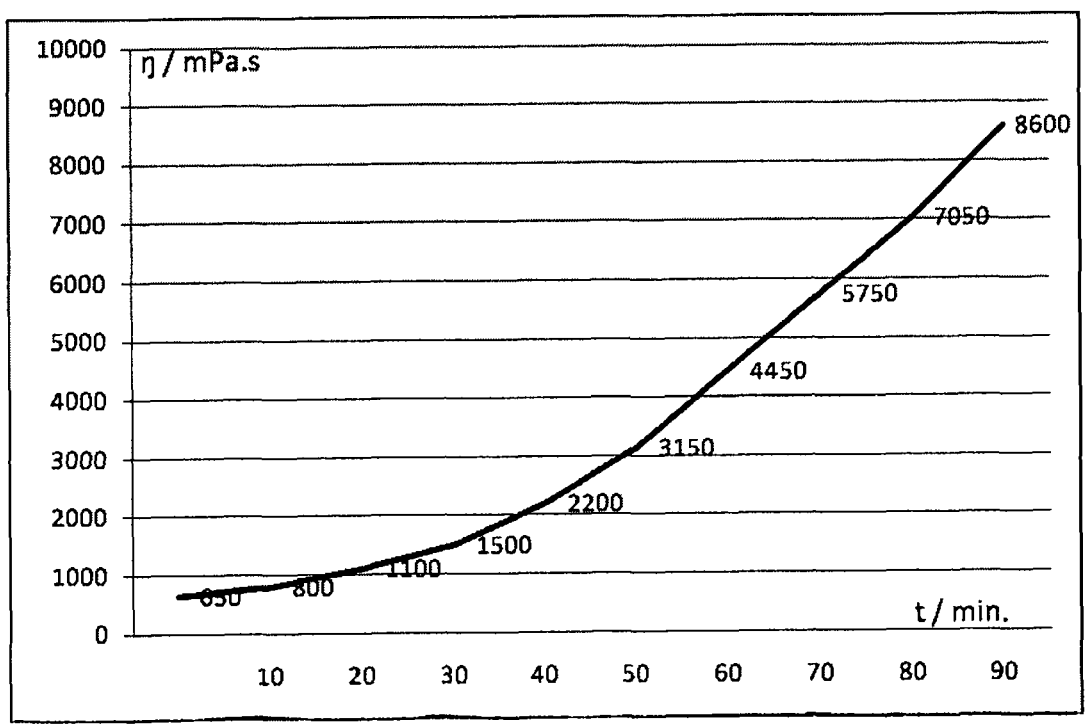
FIG. 1 illustrates the viscosity variation of the adhesive in Example 1 as a function of time.

The vegetable oil based polyol, also called hydroxylated vegetable oil, is derived from a vegetable oil. As used herein, the term a first vegetable oil based polyol A comprises castor oil based polyol or soybean oil based polyol, and the term a second vegetable oil based polyol B comprises linseed oil based polyol or tung oil based polyol.

The hydroxylated vegetable oil can be prepared by hydrolyzing an epoxidized vegetable oil. The crude vegetable oil is generally refined by settling to separate gums and other insoluble and impurities such as color bodies and phospholipids. The oil layer is removed and can be further treated with an alkali to remove free fatty acids which may be present. The refined vegetable oil can be epoxidized by reaction with peroxide such as hydrogen peroxide, and per-organic acids, such as peracetic acid, perbenzoic acid. The vegetable oils can also be epoxidized by reaction with oxygen and peroxide-containing reagents, which donates a single oxygen. Typical peroxide reagents include hydrogen peroxide, peroxycarboxylic acids (generated in situ or preformed), and alkyl hydroperoxides. The most preferred preparation is the oxidation of vegetable oil, preferably by blowing air through the vegetable oil for a sufficient time to oxidize the unsaturated groups of the triglyceride esters in the vegetable oil. The blown or epoxidized vegetable oil is hydrolyzed to open the epoxy rings and form adjacent hydroxyl groups, thus preparing a reactive polyol. The hydrolysis is preferably conducted by reacting the blown vegetable oil with water at a temperature from 170° C. to about 200° C. over a period of time from about 5 hours to about 10 hours.

In certain preferred embodiments, the first vegetable oil based polyol A is castor oil based polyol having a hydroxyl number from 50 to 190, depending on the degree of adhesion desired in the final adhesive composition. For adhesive compositions having high adhesion, a hydroxylated derivative having a hydroxyl number in the high end of the range, e.g., from 135 to 190 is used. For less adhesive products, such as those to be applied as a carpet adhesive, hydroxylated soy oil having a hydroxyl number from 50 to about 135 can be used. The amount of the first vegetable oil based polyol A in the First Component is preferably from 25 to 35 by weight percent. The amount of the first vegetable oil based polyol A in the Second Component is preferably from 92 to 97 by weight percent.

In certain preferred embodiments, the second vegetable oil based polyol B is linseed oil based polyol for its availability and high content of triglycerides of unsaturated fatty acids such as linoleic, oleic and linolenic acids and lesser contents of triglycerides of saturated fatty acids such as palmitic and stearic acids. Having a high content of unsaturated bonds, linseed oil based polyol is particularly susceptible to reactions upon exposure to free aromatic amines. Only small content of linseed oil based polyol can considerably decrease the content of free aromatic amines in resulted product. Other vegetable oils with high content of unsaturated bonds, such as tung oil, also can show desired performance to free aromatic amines. The person having ordinary skill in the art can give more such vegetable oils. The amount of the second vegetable oil based polyol B in the First Component is preferably from 1 to 3 by weight percent.

The said polyisocyanate C is polyfunctional. Suitable polyfunctional isocyanates preferably contain on average 2 to at most 5, preferably up to 4 and in particular 2 or 3, NCO groups. Examples of suitable isocyanates include 2,4'/4,4'-tolylene diisocyanate (TDI), 2,4'/4,4'-diphenylmethane diisocyanate (MDI), phenyl isocyanate, 1,5-naphthylene diisocyanate, hydrogenated MDI (HI2MDI), xylylene diisocyanate (XDI), m- and p-tetramethyl xylylene diisocyanate (TMXDI), 4,4'-diphenyldimethylmethane diisocyanate, tetraalkyldiphenylmethane diisocyanate, 4,4'-dibenzyl diisocyanate, 1,3-phenylene diisocyanate, 1,4-phenylene diisocyanate, 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), or combinations thereof. 4,4'-diphenylmethane diisocyanate (MDI) is preferred in certain embodiments. The amount of the said polyisocyanate C in the First Component is preferably from 65 to 70 by weight percent.

The said Polyol E in the Second Component, as a reactive dilution agent in the adhesive, comprises low molecular polyhydric alcohols (preferably diols) or the corresponding polyester polyols prepared by the reaction of the low molecular polyols with low molecular polybasic (preferably dibasic) carboxylic acids. Suitable polyhydric alcohols include ethylene glycol, 1,2- and 1,3-propanediol, dipropylene glycol, 1,4- and 2,3-butanediol, 1,6-hexanediol, 1,8-octanediol, neopentyl glycol, 1,3- and 1,4-bis(hydroxy-methyl)cyclohexane, 2-methyl-1,3-propanediol, glycerol, trimethylolpropane, 1,2,6-hexanetriol, 1,2,4-butanetriol, trimethylolethane, pentaerythritol, quinnitol, mannitol, sorbitol, methyl glycoside, diethylene glycol, triethylene glycol, tetraethylene glycol, polyethylene glycols, dipropylene glycol, polypropylene glycols, dibutylene glycol, and poly-butylene glycols. While dipropylene glycol is preferred, the polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic 55 acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and 60 trimeric fatty acids, dimethyl terephthalic, and terephthalic acid bis-glycol esters. The amount of polyol E in the Second Component is preferably from 1 to 2 by weight percent.

The two-component polyurethane adhesive according to the certain embodiments of the invention may also contain auxiliary substances, which preferably are completely or partially admixed to the First Component and/or the Second Component. Substances except for fillers are usually added in small quantities in order to modify the properties of the essential components in the required direction, for example, to accommodate their workability, stability in storage and also properties in use to the particular field of application. Useful auxiliary substances may include: fillers, flow-control agents, deaerators, thixotropic agents, catalysts, antioxidants, dyes, drying agents, flame-proofing agents, solvents and wetting agents. In one embodiment of the invention, the First Component further comprises antioxidant D in amounts of less than about 0.5 weight percent, wherein the antioxidant D comprises triphenyl phosphite, butylated hydroxyanisole (BHA), dibutyl hydroxy toluene (BHT), ditert-butylhydro quinone (TBHQ), propyl gallate (PG), or combinations thereof. In another embodiment of the invention, the Second Component further comprises a coupling agent F in amounts of less than about 0.5 weight percent, wherein the coupling agent F comprises silane coupling agents, chromium complex coupling agent, titante coupling agent, or combinations thereof. The Second Component may also further comprises less than about 0.5 weight percent of organic acid additive G, such as citric acid, acetic acid, oleic acid, tannin, and combinations thereof.

Adhesive Making Process:

To produce the claimed two-component polyurethane adhesive, firstly, the First Component is prepared by mixing ingredient a first vegetable oil based polyol A, a second vegetable oil based polyol B and antioxidant D by optionally heating the mixture to 95 to 105° C. with stirring. The polyisocyanate C is then admixed into this mixture. The Second Component is also prepared by mixing ingredient a first vegetable oil based polyol A, polyol E, coupling agent F and organic acid additive G at a temperature of about 95 to 105° C.

It is conventional to store the First and Second Components in separate containers sized in conformity to the relative proportions of the Components, until they are applied in two-component form, i.e. up to the time of their application. In a preferred embodiment of the invention, the First Component and Second Component are packaged in two side-by-side cylinders which are secured together in a single package and which have dispensing plungers secured to a common dispensing handle. For the application, these two components are mixed with one another in a known manner or operating condition and the mixture is applied to the substrates which are to be bonded together.

The First Component and the Second Component of embodiments of the inventive adhesive are admixed together for application in proportions of 100 parts of the First Component to 60 to 85 parts of the Second Component, preferably in proportions of 100 parts to about 75 parts.

The two-component polyurethane adhesive according to embodiments of the invention can be applied to laminate surfaces of widely varied flexible substrates including OPP, CPP, PVDC, LDPE, PET, PA, VMPET, cellophane paper, and combinations of these substrates to the same or differing substrate. The two component polyurethane system of embodiments of the invention may be formed to any degree desired to serve as a sealant and an adhesive simply by adjustment of the proportions of reactants.

The two-component polyurethane adhesive according to the current invention displays desirable physical properties such as pot life, peeling strength, tensile and shear strength. Significantly, the adhesive of embodiments of the invention may be applied at temperatures between about 30 and 40° C., as well as at lower temperatures such as room temperature (about 25° C.). In addition, the cure time of embodiments of the two component polyurethane adhesive range from two or more days to a maximum of seven days.

Moreover, pot life (also known as working life or usable life) is an important property in the application of two component polyurethane adhesives. Generally, a pot life of more than 30 minutes is desirable. For example, the pot life of one commercial system, namely ADEKIT A 200 BK, a two component room temperature cure polyurethane adhesive available from Axson Technologies, is 40 minutes at 25° C. The two component polyurethane adhesives of embodiments of the invention have longer pot life and lower viscosity than known systems. The initial viscosity ranges from about 650 mPa·s at room temperature, and after 30 minutes the viscosity may increase to about 1,500 mPa·s. In contrast, the initial viscosity of another commercial system, Liofol® UR7740/UR6050 available from HENKEL KOMMANDITGESELL-SCHAFT AUF AKTIEN (Düsseldorf/Germany) is 1,500 mPa·s at 75° C.

The two-component polyurethane adhesive according to preferred embodiments of the invention has a bio-based, renewable content of about 60 weight percent. More importantly, due to the vegetable oil derivatives especially the second vegetable oil based polyol B, certain embodiments of the inventive adhesive may be prepared and applied with minimal or with no migrated aromatic amines.

EXAMPLES

The following examples are illustrative of certain embodiments of the invention without being limitative thereof.

In the following examples, the raw materials are as follows:
Polyol A—hydroxylated castor oil
Polyol B—hydroxylated linseed oil
Polyisocyanate C—4,4'-diphenylmethane diisocyanate (MDI), Bayer 2640
Antioxidant D—triphenyl phosphite
Polyol E—dipropylene glycol
Coupling Agent F—silane coupling agents
Organix Acid Additive G—citric acid Preparation and Weight Percentage of the Adhesives To prepare the adhesives, the raw materials were used in amounts showed in Table 1.

TABLE 1

| Raw Materials | | Content (weight parts) | | Content of First & Second Components (weight parts) |
|---|---|---|---|---|
| | | Example 1 | Example 2 | |
| First Component | Polyol A | 50 | 50 | 100 |
| | Polyol B | 3 | 0 | |
| | Polyisocyanate C | 100 | 100 | |
| | Antioxidant D | 0.1 | 0.1 | |
| Second Component | Polyol A | 100 | 100 | 75 |
| | Polyol E | 1.5 | 1.5 | |
| | Coupling Agent F | 0.1 | 0.1 | |
| | Organix Acid Additive G | 0.1 | 0.1 | |

First Component Preparation

Polyols A and B (only for Example 1) and Antioxidant D were admixed in a round-bottom flask, subsequently dehydrated at a temperature of 100° C. under a vacuum pressure less than 0.09 MPa for 2 hours. Then $N_2$ was fed into the flask and Polyisocyanate C was added into the mixture to react at a temperature of 80° C. to 90° C. for 2 to about 3 hours, to obtain the First Component.

Second Component Preparation

Polyols A and E, coupling agent F and organic acid additive G were admixed in a round-bottom flask, the resultant mixture was then heated up to about 100° C. and maintained at that temperature for about 2 hours for dehydration under a vacuum pressure less than 0.09 MPa to obtain the Second Component.

The First Component was admixed with the Second Component in a ratio of 100 parts First Component to 75 parts Second Component to obtain two-component laminating adhesives.

Physical Properties of the Adhesives

FIG. 1 shows the relation between the keeping time and the viscosity of the adhesive of Example 1. As illustrated by FIG. 1, up to 30 minutes following mixing the First and Second Components, the viscosity of the adhesive was about 1500 mPa·s (at 25° C.), and from about 30 minutes to about 50 minutes after mixing the First and Second Components, the adhesive had a viscosity of about 3,150 mPa·s. That is, the adhesive of Example 1 has a longer pot life than that of the two component polyurethane adhesives products currently commercially available or known.

To test the peeling strength, the adhesive of Example 1 is applied to each of a VMPET/PE film, a BOPP/PE film and a BOPA/CPP film (2 g/m$^2$). The results given in Table 2 illustrate that the adhesive of Example 1 has an unexpectedly high peeling strength when applied to these films.

TABLE 2

|  |  | VMPET/PE film | BOPP/PE film | BOPA/CPP film |
|---|---|---|---|---|
| Peel Strength (N/mm$^2$) | Traverse | 2.3 | Cannot be peeled off | 5.8 |
|  | Vertical | 2.8 | Cannot be peeled off | Cannot be peeled off |

(Conditions: room temperature)

Free Aromatic Amines Test

Free MDI was tested for the adhesives of both Examples 1 and 2 by GC-MS (Agilent GC-MS 5975B), using the following testing conditions:

Input mode: automatic injection; injection volume: 1 ul;
chromatographic column: HP-5MS, 30 m*250 um*0.25 um;
carrier gas: He;
flow rate of carrier gas: 1 ml/min;
mass spectrometry is used for detecting.

The results illustrate that the area of MDI of Example 1 was 53456 and that of Example 2 was 119334 (average value of three testing results for each Example), illustrating that the free MDI content can be reduced by 55.2% when Polyol B was present in the First Component. Thus, the presence of hydroxylated linseed oil in the inventive two-component polyurethane adhesive considerably reduces the migration of aromatic isocyanate in the final products.

We claim:

1. A two-component solvent-free polyurethane adhesive comprising:
a First Component comprising:
a first vegetable oil based Polyol A in an amount from 20 to 40 weight percent,
a second vegetable oil based Polyol B in an amount from 0.5 to 5 weight percent, and
a Polyisocyanate C in amount from 60 to 74 weight percent; and
a Second Component comprising:
a first vegetable oil based Polyol A in an amount from 87 to 99 weight percent, and
a Polyol E in an amount from 0.5 to 5 weight percent.

2. The two-component solvent-free polyurethane adhesive of claim 1, wherein the first vegetable oil based Polyol A are selected from the group of castor oil based polyols and soybean oil based polylol polyols.

3. The two-component solvent-free polyurethane adhesive of claim 1, wherein the second vegetable oil based Polyol B is linseed oil based polyol or tung oil based polyol.

4. The two-component solvent-free polyurethane adhesive of claim 2, wherein the amount of the first vegetable oil based Polyol A in the First Component is between 25 and 35 by weight percent.

5. The two-component solvent-free polyurethane adhesive of claim 3, wherein the amount of the first vegetable oil based Polyol A in the Second Component is between 92 and 97 by weight percent.

6. The two-component solvent-free polyurethane adhesive of claim 2, wherein the amount of the second vegetable oil based Polyol B in the First Component is between 1 and 3 by weight percent.

7. The two-component solvent-free polyurethane adhesive of claim 1, wherein the Polyisocyanate C is a polyfunctional isocyanate containing between 2 and 5 NCO groups.

8. The two-component solvent-free polyurethane adhesive of claim 7, wherein the Polyisocyanate C comprises 4,4'-diphenylmethane diisocyanate (MDI).

9. The two-component solvent-free polyurethane adhesive of claim 1, wherein the Polyol E is selected from the group consisting of ethylene glycol, 1,2- and 1,3-propanediol, dipropylene glycol, 1,4- and 2,3-butanediol, 1,6-hexanediol, 1,8-octane dio, neopentyl glycol, 1,3- and 1,4-bis(hydroxy-methyl)cyclohexane, 2-methyl-1,3-propanediol, glycerol, trimethylolpropane, 1,2,6-hexanetriol, 1,2,4-butanetriol, trimethylolethane, pentaerythritol, quinnitol, mannitol, sorbitol, methyl glycoside, diethylene glycol, triethylene glycol, tetraethylene glycol, polyethylene glycols, dipropylene glycol, polypropylene glycols, dibutylene glycol, and poly-butylene glycols.

10. The two-component solvent-free polyurethane adhesive of claim 1, wherein the Polyol E is selected from polyester polyols by the reaction of polyhydrical alcohol selected from the group of consisting of ethylene glycol, 1,2- and 1,3-propanediol, dipropylene glycol, 1,4- and 2,3-butanediol, 1,6-hexanediol, 1,8-octanediol, neopentyl glycol, 1,3- and 1,4-bis(hydroxy-methyl)cyclohexane, 2-methyl-1,3-propanediol, glycerol, trimethylolpropane, 1,2,6-hexanetriol, 1,2,4-butanetriol, trimethylolethane, pentaerythritol, quinnitol, mannitol, sorbitol, methyl glycoside, diethylene glycol, triethylene glycol, tetraethylene glycol, polyethylene glycols, dipropylene glycol, polypropylene glycols, dibutylene glycol, and poly-butylene glycols, and polybasic carboxylic acid selected from the group of succinic acid, adipic acid, suberic acid, azelaic acid, sebacic acid, phthalic acid, isophthalic acid, trimellitic 55 acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters.

11. The two-component solvent-free polyurethane adhesive of claim 9, wherein the Polyol E comprises dipropylene glycol.

12. The two-component solvent-free polyurethane adhesive of claim 1, wherein the First Component further comprises Antioxidant D in an amount of less than about 0.5 weight percent.

13. The two-component solvent-free polyurethane adhesive of claim 12, wherein the Antioxidant D is selected from the group consisting of triphenyl phosphite, butylated hydroxyanisole (BHA), dibutyl hydroxy toluene (BHT), ditert-butylhydro quinone (TBHQ) and propyl gallate (PG).

14. The two-component solvent-free polyurethane adhesive of claim 1, wherein the Second Component further comprises Coupling Agent F in an amount of less than about 0.5 weight percent.

15. The two-component solvent-free polyurethane adhesive of claim 14, wherein the Coupling Agent F is selected from the group consisting of silane coupling agents, chromium complex coupling agents and titante coupling agents.

16. The two-component solvent-free polyurethane adhesive of claim 1, wherein the Second Component further comprises an Organic Acid Additive G in an amount of less than about 0.5 weight percent.

17. The two-component solvent-free polyurethane adhesive of claim 16, wherein the Organic Acid Additive G is selected from the group consisting of citric acid, acetic acid, acetic acid, oleic acid, and tannin.

18. The two-component solvent-free polyurethane adhesive of claim 1, wherein the First Component and the Second Component of the adhesive are present in proportions of 100 parts of the First Component to 60 to 85 parts of the Second Component.

19. The two-component solvent-free polyurethane adhesive of claim 18, wherein the proportion of the First Component and the Second Component is 100 parts to 75 parts.

* * * * *

UNITED STATES PATENT AND TRADEMARK OFFICE
CERTIFICATE OF CORRECTION

PATENT NO. : 8,022,164 B1
APPLICATION NO. : 12/717610
DATED : September 20, 2011
INVENTOR(S) : Yang Wu et al.

Page 1 of 1

It is certified that error appears in the above-identified patent and that said Letters Patent is hereby corrected as shown below:

Column 2, Line 5, replace "2,4-toluene" with -- "2, 4-toluene" --

Column 4, Line 29, replace "Polyol Bin" with -- "Polyol B in" --

Column 9, Line 67, replace "polylol polyols" with -- "polyol" --

Column 10, Line 14, replace "Polyol Bin" with -- "Polyol B in" --

Column 12, Claim 17, Lines 1 and 2, replace "acetic acid, acetic acid" with -- "acetic acid" --

Signed and Sealed this
Twenty-fifth Day of December, 2012

David J. Kappos
*Director of the United States Patent and Trademark Office*